United States Patent
Phua et al.

(10) Patent No.: US 6,996,299 B2
(45) Date of Patent: Feb. 7, 2006

(54) ALL-FREQUENCY PMD COMPENSATOR AND EMULATOR

(75) Inventors: Poh-Boon Phua, Medford, MA (US); Hermann A. Haus, deceased, late of Lexington, MA (US); by Eleanor L. Haus, legal representative, Lexington, MA (US); Erich P. Ippen, Belmont, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 0 days.

(21) Appl. No.: 10/902,608

(22) Filed: Jul. 29, 2004

(65) Prior Publication Data

US 2005/0044116 A1 Feb. 24, 2005

Related U.S. Application Data

(60) Provisional application No. 60/491,711, filed on Aug. 1, 2003.

(51) Int. Cl.
*G02B 6/27* (2006.01)
*G02B 27/28* (2006.01)

(52) U.S. Cl. ........................... 385/11; 359/485

(58) Field of Classification Search ............... 385/11
See application file for complete search history.

(56) References Cited

U.S. PATENT DOCUMENTS 6,556,732 B1 * 4/2003 Chowdhury et al. ......... 385/11

OTHER PUBLICATIONS

"Deterministic Broad-Band PMD Emulator," Phua et al., *IEEE Photonics Technology Letters*, vol. 16, n. 6, pp. 1486-1488 (Jun. 6, 2004).

* cited by examiner

*Primary Examiner*—John D. Lee
*Assistant Examiner*—Rhonda S. Peace
(74) *Attorney, Agent, or Firm*—Gauthier & Connors LLP

(57) ABSTRACT

A PMD device includes a first stage that receives a signal and performs rotation about {1,0,0} on the signal. The first stage outputs a first signal. A second stage receives the first signal and performs a rotation about {0,0,1} on the first signal. The second stage outputs a second signal that represents the alignment the PMD of various frequencies into a common direction. A third stage receives the second signal and provides the necessary frequency dependent variable in the {1,0,0} direction to cancel the PMD in any specified frequency range.

42 Claims, 8 Drawing Sheets

All-Freq. PMD Compensator

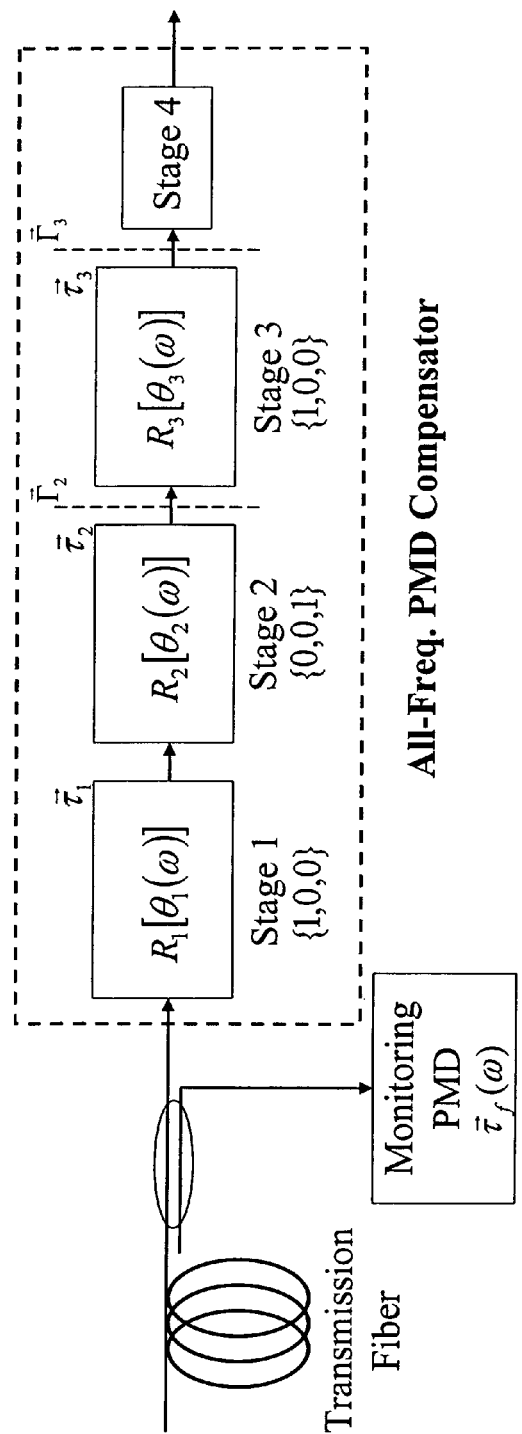
FIG. 1A
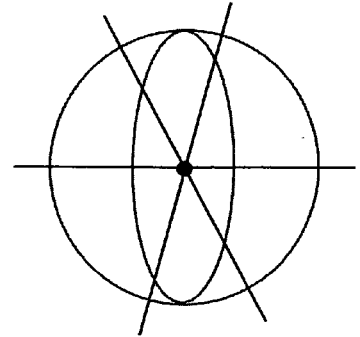
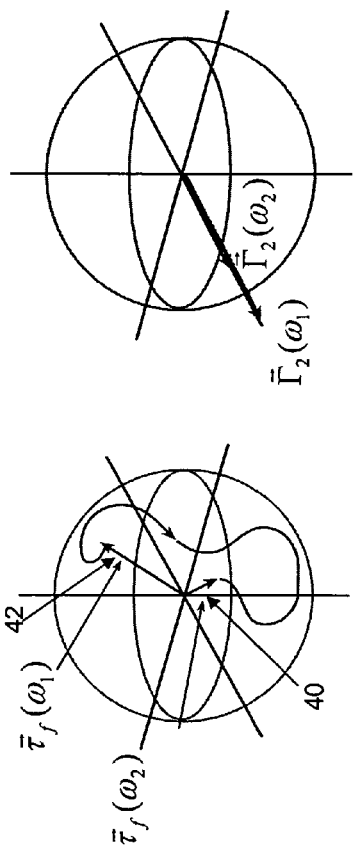
FIG. 1B

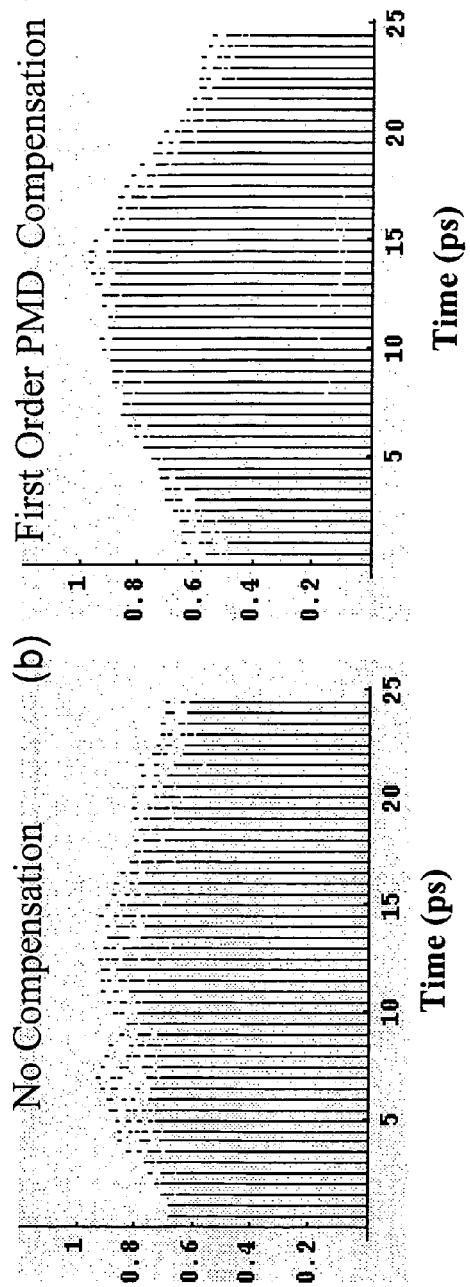
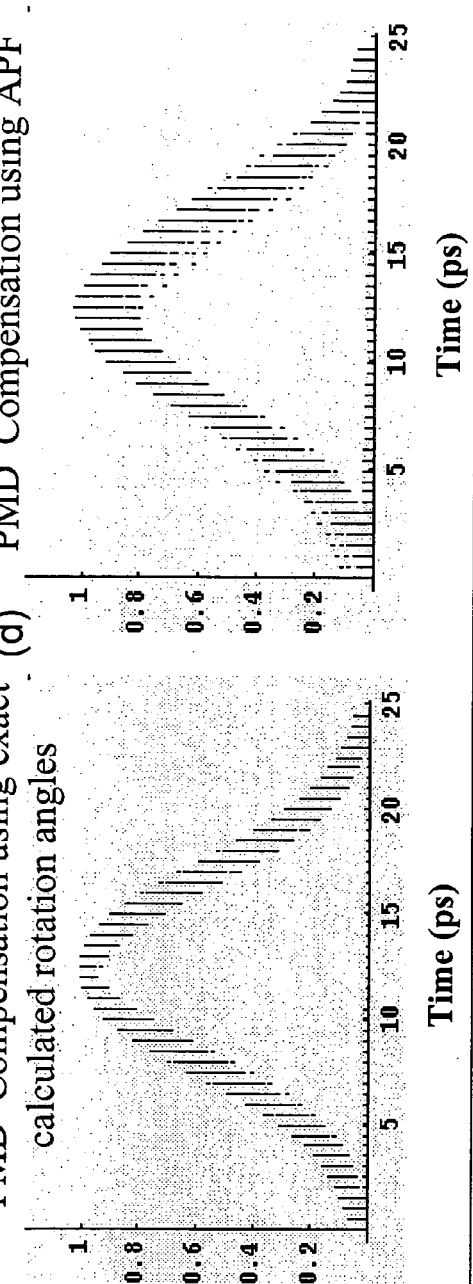
FIG. 4A
FIG. 4B
FIG. 4C
FIG. 4D

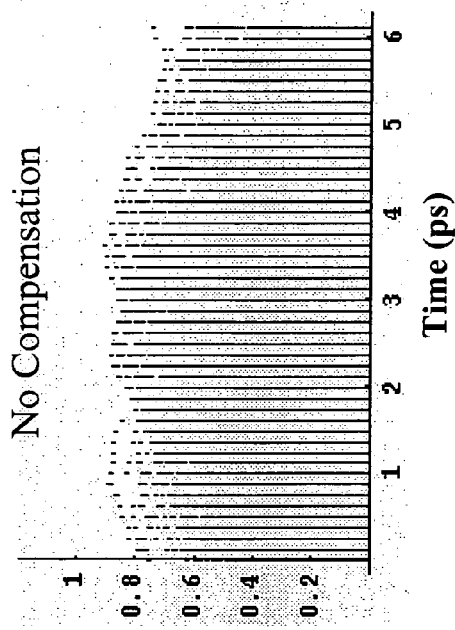
FIG. 5A
FIG. 5B
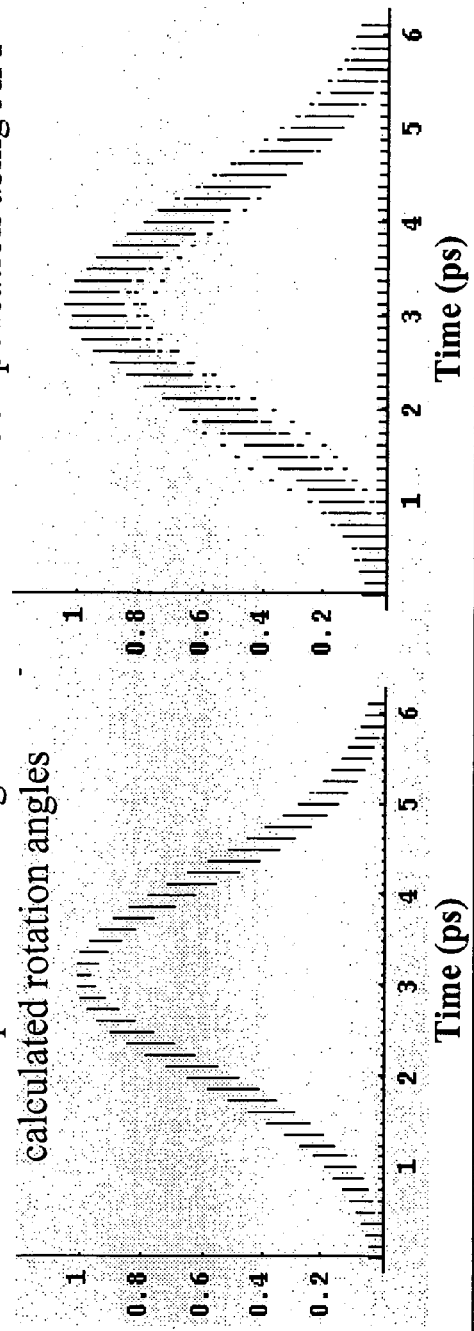
FIG. 5C

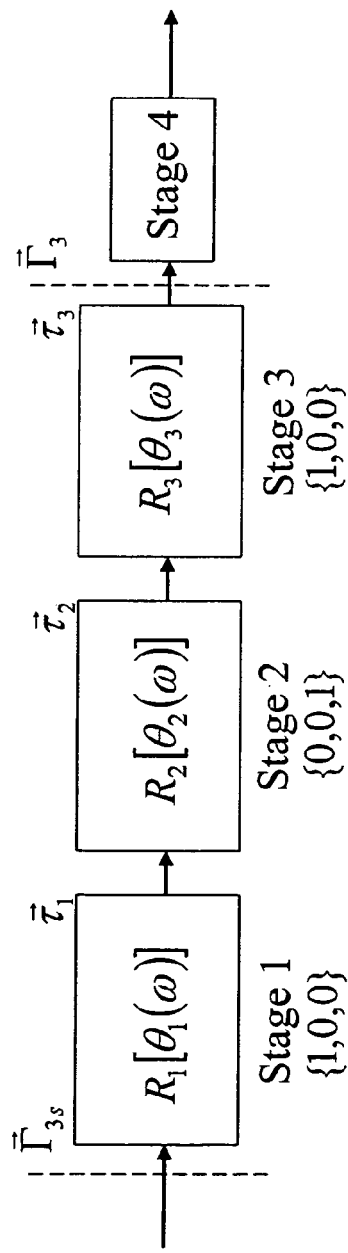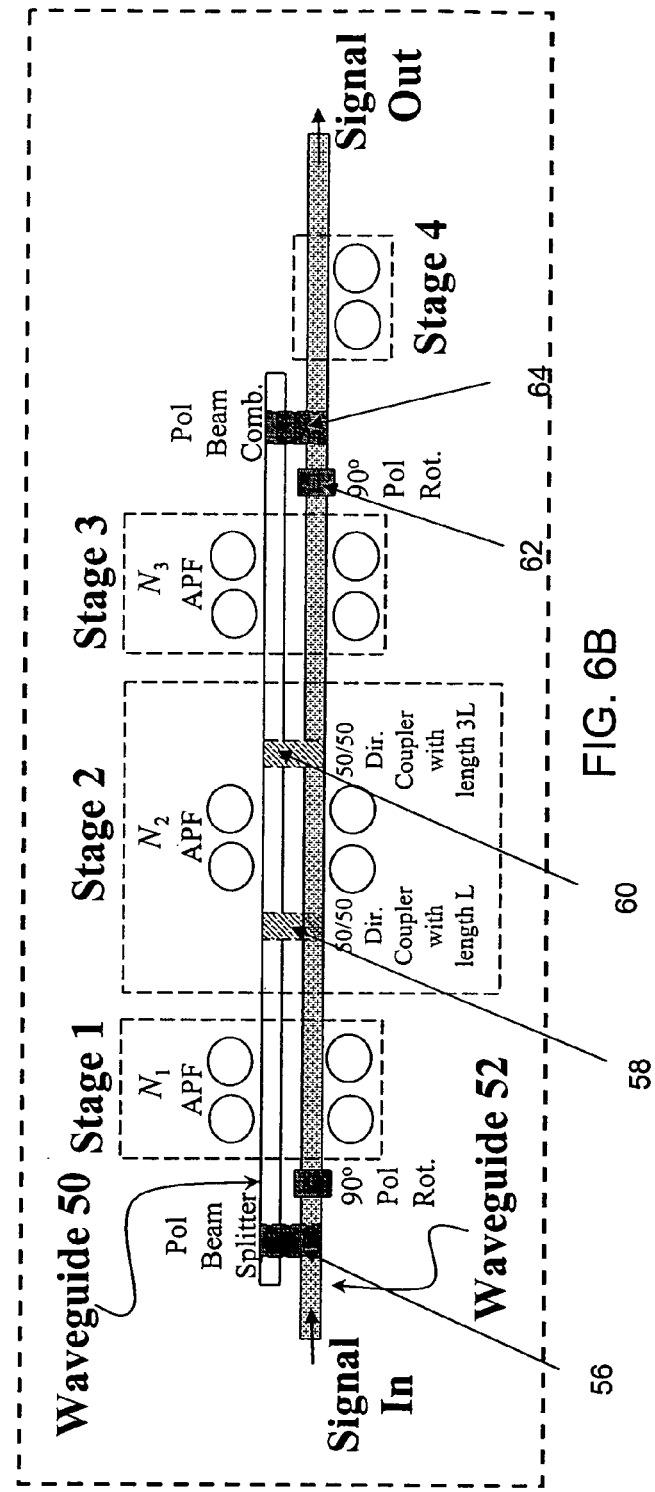

ALL-FREQUENCY PMD COMPENSATOR AND EMULATOR

PRIORITY INFORMATION

This application claims priority from provisional application Ser. No. 60/491,711 filed Aug. 1, 2003, which is incorporated herein by reference in its entirety.

BACKGROUND OF THE INVENTION

The invention relates to the field polarization mode dispersion, and in particular to a device that can compensate and emulate within a large frequency range.

As the bit rate of a single channel increases, a compensator that cancels first order polarization mode dispersion (PMD) is no longer sufficient since higher order PMD dominates the signal's degradation. Typical higher order PMD compensators are multistage devices that have many degrees of freedom. If the compensation scheme relies on feedback loops, the complexity involved in searching the optimum of many parameters may hinder the development of a fast and stable compensator. Thus, feed-forward approach to PMD compensation appears more feasible when higher order PMD compensation need to be addressed. Recently, several schemes of real-time PMD estimation technique had been proposed.

Previous approaches to all-frequency PMD compensation aim to generate the inverse of transmission fiber's Jones matrix $U(\omega)$ for all frequencies. Most of these efforts concentrate on the synthesis of filter response to approximate this unitary matrix, $U(\omega)$. In one architecture, it describes using all-pass filters to invert the measured Jones matrix $U(\omega)$ approximately. The approach is very promising as it can be compactly integrated using planar waveguides.

SUMMARY OF THE INVENTION

The invention provides an architecture that suppress the information about the isotropic dispersion in the Stokes space formulation, and show that the knowledge of the output PMD vector, $\vec{\tau}_f(\omega)$, as a function of frequency is sufficient for the construction of an all-frequency PMD compensator. The Jones matrix $U(\omega)$ varies more rapidly than its frequency dependent counterpart, $jU_\omega(\omega)U^+(\omega)$, which represents the output PMD in Jones Space formulation. Thus, one of the main advantages of compensating the output PMD $\vec{\tau}_f(\omega)$ is that the real-time monitoring and compensation can be performed at a slower rate than compensating the Jones matrix. In addition, monitoring of the fiber's output PMD $\vec{\tau}_f(\omega)$ does not require any knowledge of the input state of polarization (SOP), thus polarization scrambling of the input SOP can be used to improve estimation accuracy of the PMD monitoring.

According to one aspect of the invention, there is provided a PMD device. The PMD device includes a first stage that receives a signal and performs rotation about $\{1,0,0\}$ on the signal. The first stage outputs a first signal. A second stage receives the first signal and performs a rotation about $\{0,0,1\}$ on the first signal. The second stage outputs a second signal that represents the alignment the PMD of various frequencies into a common direction. A third stage receives the second signal and provides the necessary frequency dependent variable Differential Group Delay (DGD) in the $\{1,0,0\}$ direction to cancel the PMD in any specified frequency range.

According to another aspect of the invention, there is provided a PMD compensator. The PMD compensator includes a first stage that receives a signal and performs rotation about $\{1,0,0\}$ on the signal. The first stage outputs a first signal. A second stage receives the first signal and performs a rotation about $\{0,0,1\}$ on the first signal. The second stage outputs a second signal that represents the alignment the PMD of various frequencies into a common direction. A third stage receives the second signal and provides the necessary frequency dependent variable DGD in the $\{1,0,0\}$ direction to cancel the PMD in any specified frequency range.

According to another aspect of the invention, there is provided a method of operating a PMD device. The method includes receiving at a first stage a signal and performing rotation about $\{1,0,0\}$ on the signal. The first stage outputs a first signal. The method includes receiving at a second stage the first signal and performing a rotation about $\{0,0,1\}$ on the first signal. The second stage outputs a second signal that represents the alignment the PMD of various frequencies into a common direction. Furthermore, the method includes receiving at a third stage the second signal and providing the necessary frequency dependent variable DGD in the $\{1,0,0\}$ direction to cancel the PMD in any specified frequency range.

BRIEF DESCRIPTION OF THE DRAWINGS

FIGS. 1A–1B are schematic diagrams illustrating a PMD compensator in accordance with the invention;

FIGS. 4A–4D are graphs demonstrating eye-diagrams of the signals shown in FIGS. 3A–3D;

FIG. 5A is a graph illustrating the eye-diagrams of the output signals from the fiber before compensation; FIG. 5B is a graph illustrating the eye-diagrams of the signals after the PMD compensation using exact rotation angles; FIG. 5C is a graph demonstrating an eye-diagram of the signals after PMD compensation using approximated rotation angles synthesized by all-pass filter;

FIGS. 6A–6B are schematic diagrams illustrating another exemplary embodiment of a PMD compensator in accordance with the invention;

DETAILED DESCRIPTION OF THE INVENTION

Figure 2:
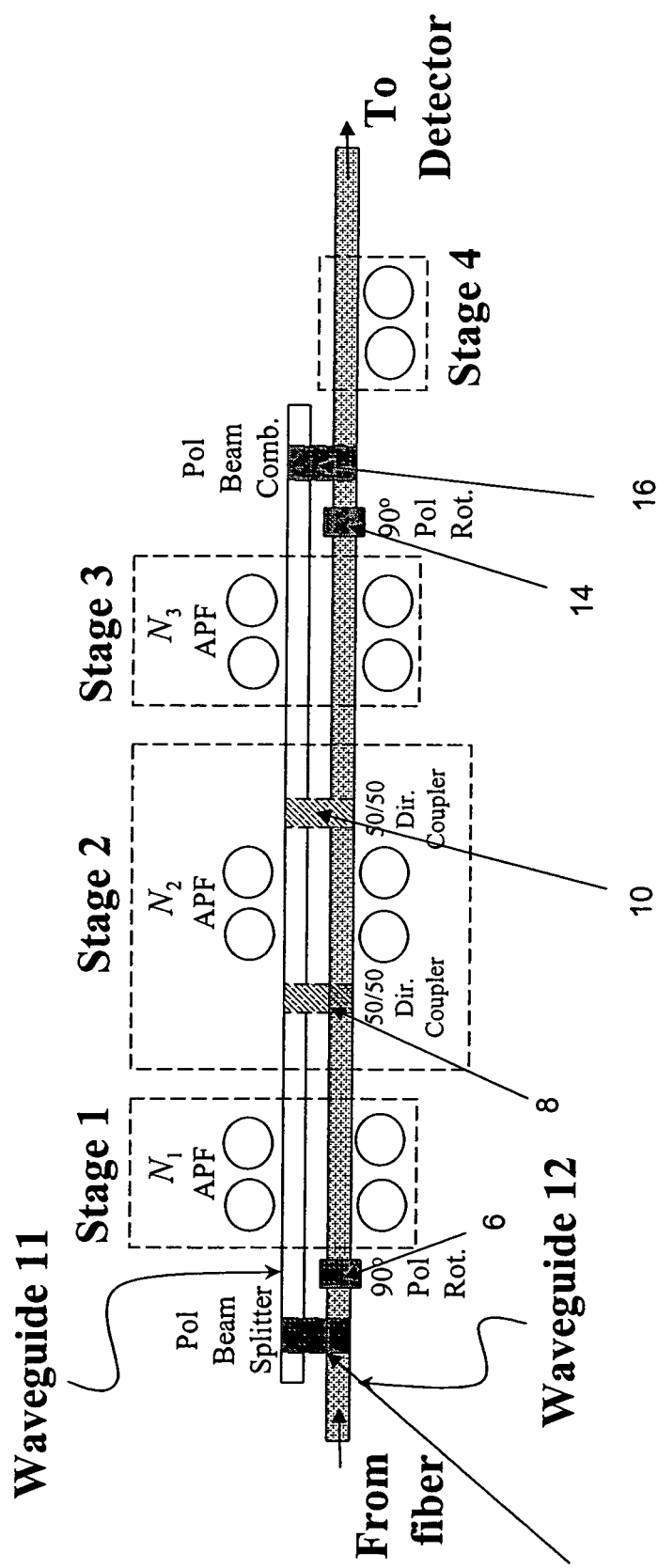
FIG. 2 is a schematic diagram illustrating a detailed depiction of the PMD compensator of the invention.

The invention describes an architecture of a compensator that can compensate PMD for all frequency based solely on the knowledge of the output PMD vectors, $\vec{\tau}_f(\omega)$, as a function of frequency. It employs four stages. The first two stages provide an equivalent frequency dependent polarization rotation effect to align all PMD vectors into a common direction, and the third stage compensates the frequency dependent variable DGD. The last stage basically compensates the isotropic dispersion introduced by the first three stages. These stages can be implemented using all-pass filters (APF), however, other similar components that generate frequency-dependent phase profiles can be used. The required phase responses of these filters are distinctly different from other approaches in the prior art to approximate the inverse Jones matrix while the aim is to compensate its frequency-dependent part (i.e. $jU_\omega(\omega)U^+(\omega)$). In Stokes space formulation, the synthesis algorithm of the required rotation angles of the various stages using PMD concatenation rules is presented, and these filter responses are shown to be realistic and can be approximated by relatively few APF. Through simulations, significant improvement of the signal quality using such architecture is demonstrated.

For simplicity, one may neglect polarization-dependent losses, and assume that using the real-time PMD monitoring scheme, the fiber's output PMD vector, $\vec{\tau}_f(\omega)$ is known, as a function of frequency. Expressing the PMD as a Taylor expansion about the center frequency, $\omega_o$, is avoided since this introduces complicated higher-order PMD terms such as $$\frac{d\vec{\tau}}{d\omega}, \frac{d^2\vec{\tau}}{d\omega^2}$$

etc. Instead, the whole PMD spectrum is treated as first order PMD vectors that vary from frequency to frequency. For this reason, one can choose to call the proposed scheme "All-Frequency", instead of "All-Order", PMD compensator.

FIG. 1A shows the schematic of the proposed architecture. A portion of the signal is tapped at the fiber output for real-time PMD monitoring. Based on the knowledge of the PMD vector data, one can control the 4-stage compensator. At each angular frequency $\omega$ ($\omega=2\pi f$ where f is the optical frequency), the fiber's output PMD vector, $\vec{\tau}_f(\omega)$, has three parameters $$\begin{pmatrix} \tau_{fx}(\omega) \\ \tau_{fy}(\omega) \\ \tau_{fz}(\omega) \end{pmatrix}.$$

The first three stages of the compensator provide the three degrees of freedom at each frequency for the PMD cancellation. Stage 4 only deals with the isotropic dispersion introduced by the first three stages. In Stokes space, Stage 1 is a rotation about $\{1,0,0\}$ with rotation angle $\theta_1(\omega)$ as a function of frequency while Stage 2 is a rotation about the $\{0,0,1\}$ with rotation angle $\theta_2(\omega)$ which is also a function of frequency. The combined effect of stage 1 and 2 is equivalent to that of a frequency-dependent polarization controller that aligns the PMD of various frequencies into a common direction, in this case, one can choose it to be $\{1,0,0\}$.

FIG. 1B illustrates this rotation effect. After aligning the PMD vectors 40, 42, Stage 3 provides the necessary frequency dependent variable DGD $$\tau_3(\omega) = \frac{d\theta_3(\omega)}{d\omega}$$

in the $\{1,0,0\}$ direction to cancel the PMD. Since the rotation angles of Stage 1 and 2 are a function of frequency, they possess substantial DGD that cannot be neglected. This is in contrary to polarization controllers that employ low-order wave-plates. Finally, Stage 4 compensates for the isotropic dispersion introduced by the first three stages due to imperfect fitting of the rotation angles. This will be further discussed. In Stokes space, the rotation matrix of Stage 1 is $$R_1(\omega) = \begin{pmatrix} 1 & 0 & 0 \\ 0 & \cos\theta_1(\omega) & -\sin\theta_1(\omega) \\ 0 & \sin\theta_1(\omega) & \cos\theta_1(\omega) \end{pmatrix} \quad (1)$$

and the rotation matrix of Stage 2 is $$R_2(\omega) = \begin{pmatrix} \cos\theta_2(\omega) & -\sin\theta_2(\omega) & 0 \\ \sin\theta_2(\omega) & \cos\theta_2(\omega) & 0 \\ 0 & 0 & 1 \end{pmatrix} \quad (2)$$

Since $$\vec{\tau} \times \frac{dR}{d\omega} R^+,$$

the corresponding PMD vectors of stage 1 and 2 are $$\vec{\tau}_1(\omega) = \begin{pmatrix} \frac{d\theta_1(\omega)}{d\omega} \\ 0 \\ 0 \end{pmatrix} \text{ and } \vec{\tau}_2(\omega) = \begin{pmatrix} 0 \\ 0 \\ \frac{d\theta_2(\omega)}{d\omega} \end{pmatrix}$$

respectively. One can assume the fiber's PMD, $$\vec{\tau}_f(\omega) = \begin{pmatrix} \tau_{fx}(\omega) \\ \tau_{fy}(\omega) \\ \tau_{fz}(\omega) \end{pmatrix},$$

is known. To analyze the PMD after Stage 2, $\vec{\Gamma}_2(\omega)$, one can use the PMD concatenation rule.

$$\vec{\Gamma}_2(\omega) = \vec{\tau}_2(\omega) + R_2(\omega)\vec{\tau}_1(\omega) + R_2(\omega)R_1(\omega)\vec{\tau}_f(\omega) \quad (3)$$

$$= \begin{pmatrix} \cos\theta_2\left(\frac{d\theta_1}{d\omega} + \tau_{fx}\right) - \sin\theta_2(\tau_{fy}\cos\theta_1 - \tau_{fz}\sin\theta_1) \\ \sin\theta_2\left(\frac{d\theta_1}{d\omega} + \tau_{fx}\right) + \cos\theta_2(\tau_{fy}\cos\theta_1 - \tau_{fz}\sin\theta_1) \\ \frac{d\theta_2}{d\omega} + (\tau_{fy}\sin\theta_1 + \tau_{fz}\cos\theta_1) \end{pmatrix}$$

Since one wants the PMD vector of all frequency to be aligned to {1,0,0} after Stage 2, one needs $$\sin\theta_2\left(\frac{d\theta_1}{d\omega} + \tau_{fx}(\omega)\right) + \cos\theta_2(\tau_{fy}(\omega)\cos\theta_1 - \tau_{fz}(\omega)\sin\theta_1) = 0 \text{ and} \quad (4)$$

$$\frac{d\theta_2}{d\omega} + (\tau_{fy}(\omega)\sin\theta_1 + \tau_{fz}(\omega)\cos\theta_1) = 0 \quad (5)$$

Solutions of Eqs. 4 and 5 yield the required rotation angles $\theta_1(\omega)$ and $\theta_2(\omega)$. To solve these equations, the following synthesis algorithm is used. At an initial frequency, $\omega_{initial}$, one can determine the rotation angles of Stage 1 and 2 to bring $\vec{\tau}_f(\omega_{initial})$ aligned to {1,0,0}. These $\theta_1(\omega_{initial})$ and $\theta_2(\omega_{initial})$ provide the starting points for the algorithm. For subsequent frequency, one finds the rotation angles in a step-wise manner:

$$\theta_1(\omega + \Delta\omega) \approx \theta_1(\omega) + \frac{d\theta_1}{d\omega}(\omega)\Delta\omega \quad (6)$$

$$\theta_2(\omega + \Delta\omega) \approx \theta_2(\omega) + \frac{d\theta_2}{d\omega}(\omega)\Delta\omega \quad (7)$$

where $$\frac{d\theta_1}{d\omega}(\omega) \text{ and } \frac{d\theta_2}{d\omega}(\omega) \text{ are given by Eqs. (4) and (5) as} \quad (8)$$

$$\frac{d\theta_1}{d\omega}(\omega) = \cot\theta_2(\omega)[\tau_{fz}(\omega)\sin\theta_1(\omega) - \tau_{fy}(\omega)\cos\theta_1(\omega)] - \tau_{fx}(\omega)$$

and $$\frac{d\theta_2}{d\omega}(\omega) = -[\tau_{fy}(\omega)\sin\theta_1(\omega) + \tau_{fz}(\omega)\cos\theta_1(\omega)] \quad (9)$$

In this way, one can successively synthesize the rotation angles of Stage 1 and 2 to align all the PMD vectors into {1,0,0} and the PMD vector after Stage 2 becomes $$\vec{\Gamma}_2(\omega) = \begin{pmatrix} \cos\theta_2\left(\frac{d\theta_1}{d\omega} + \tau_{fx}\right) - \sin\theta_2(\tau_{fy}\cos\theta_1 - \tau_{fz}\sin\theta_1) \\ 0 \\ 0 \end{pmatrix} \quad (10)$$

Since Stage 3 is a rotation about {1,0,0}, its rotation matrix has no effect on $\vec{\Gamma}_2(\omega)$. The PMD vector of Stage 3 is $$\vec{\tau}_3(\omega) = \begin{pmatrix} \frac{d\theta_3(\omega)}{d\omega} \\ 0 \\ 0 \end{pmatrix}.$$

After passing through Stage 3, the resultant PMD vector $\vec{\Gamma}_3(\omega)$ becomes $$\vec{\Gamma}_3(\omega) = \vec{\tau}_3(\omega) + R_3(\omega)\vec{\Gamma}_2(\omega) \quad (11)$$

$$= \vec{\tau}_3(\omega) + \vec{\Gamma}_2(\omega)$$

$$= \begin{pmatrix} \frac{d\theta_3(\omega)}{d\omega} + \cos\theta_2\left(\frac{d\theta_1}{d\omega} + \tau_{fx}\right) - \sin\theta_2(\tau_{fy}\cos\theta_1 - \tau_{fz}\sin\theta_1) \\ 0 \\ 0 \end{pmatrix}$$

To have zero resultant PMD for all frequencies after Stage 3, $\vec{\Gamma}_3(\omega)$ must be zero for all frequencies. Thus, one needs $$\frac{d\theta_3(\omega)}{d\omega} = -\cos\theta_2(\omega)\left[\frac{d\theta_1}{d\omega}(\omega) + \tau_{fx}(\omega)\right] + \quad (12)$$
$$\sin\theta_2(\omega)[\tau_{fy}(\omega)\cos\theta_1(\omega) - \tau_{fz}(\omega)\sin\theta_1(\omega)]$$

Together with $\theta_1(\omega)$, $\theta_2(\omega)$, $$\frac{d\theta_1}{d\omega}(\omega) \text{ and } \frac{d\theta_2}{d\omega}(\omega)$$

(known from equations (6–9)), $\theta_3(\omega)$ is synthesized by arbitrary fixing $\theta_3(\omega_{initial})=0$ and subsequent frequency by $$\theta_3(\omega + \Delta\omega) \approx \theta_3(\omega) + \frac{d\theta_3}{d\omega}(\omega)\Delta\omega \quad (13)$$

In summary, to the synthesis algorithm, using Eqs. (6–9) and (12–13), one can synthesize the required rotation angle of $\theta_1(\omega)$, $\theta_2(\omega)$ and $\theta_3(\omega)$ for complete PMD compensation at all frequency.

There are at least three physical implementations of the proposed 4-stage AFPMD compensator. The first two implementations can be adapted from the femto-second pulse shaping schemes using a spatial light modulator or using a deformable mirror. For stage 1 and 3, the light is polarization beam split into horizontal and vertical polarization. One polarization is then dispersed spatially by a diffraction grating to form a line spectrum across the deformable mirror or spatial light modulator. The mirror (or modulator) is programmed to produce the desired changes in the spectral phase across the bandwidth. When the two polarizations are combined using a polarization beam combiner, this creates frequency-dependent rotation about {1,0,0} in Stokes space. Stage 2 has the same setup as stage 1 and 3 except for the additional quarter-wave plates before and after the setup. This makes stage 2 an equivalent rotation about {0,0,1} in Stokes space. Thus, by programming appropriate spectral phase, the required rotation angles $\theta_1(\omega)$, $\theta_2(\omega)$ and $\theta_3(\omega)$ can be produced as calculated from equation (6–9) and 12–13).

The third promising implementation is based on all-pass Filters (APFs) integrated on a planar lightwave circuit as shown in FIG. 6. An all-pass filter (APF) has unity magnitude response; and, by cascading them, one can engineer the phase response to approximate any desired response. This approach is common in the field of electrical circuit design and digital signal processing and has been used extensively for phase equalization in these fields.

Two common implementations of optical APF are (a ring resonator coupled to a straight waveguide and b) an etalon that has a perfect mirror on one side. The former is preferred for compact integrated optics. The latter is also known as a Gires-Tournois interferometer. The power coupling coefficient into the resonator and the resonant frequency are the two main filter parameters to adjust when engineering the phase response. It has been demonstrated had demonstrated that the tuning of these two filter parameters is feasible using thermal heaters in a Mach-Zehnder interferometer configuration of APF. In general, the phase response of a set of $N_i$ APF is given by:

$$\Phi_i(\omega) = N_i(\pi - \omega T) - \sum_k^{N_i}\left(\phi_k + 2\tan^{-1}\left(\frac{r_k \sin(\omega T + \phi_k)}{1 - r_k \cos(\omega T + \phi_k)}\right)\right) \quad (14)$$

where $\phi_k$ determines the cavity's resonant frequency, $r_k$ is the partial reflectance and is related to the power coupling ratio into the cavity, $\kappa_k$, by $r_k = mt;rl;\sqrt{1-\kappa inf\!beginitalkenditalresetrlxmx}$ and T is the feedback path round trip delay and is related to the free spectral range (FSR) by $$T = \frac{1}{FSR}.$$

Any phase response can be engineered by varying the filter parameters $\phi_k$ and $r_k$.

FIG. 6 shows an exemplary implementation of the architecture proposed in FIG. 1A using APF integrated on a planar light circuit. Output signals from the fiber are split into two waveguides (waveguide 11 and waveguide 12) by a polarization beam splitter 4. The polarization in waveguide 12 is rotated by 90° using polarization rotator 6. Stage 1 is comprised of a set of $N_1$ APF for each of the waveguides 11, 12 to generate phase response of $\Phi_{1H}(\omega)$ for waveguide 11 and $\Phi_{1V}(\omega)$ for waveguide 12. In Stokes space, transmission through Stage 1 corresponds to a rotation about $\{1,0,0\}$ with rotation angle $(\Phi_{1V}(\omega)-\Phi_{1H}(\omega))$ Stage 2 is comprised of a 50/50 directional coupler 8 with matched propagation constants, followed by another set of $N_2$ APF for each of the waveguides 11, 12, and then by another 50/50 directional coupler 10 with matched propagation constants.

This set of APF generates a phase response of $\Phi_{2H}(\omega)$ for waveguide 11 and $\Phi_{2V}(\omega)$ for waveguide 12. In Stokes space, the first 50/50 directional coupler gives a 90° rotation about $\{0,1,0\}$, the APF portion of Stage 2 is a rotation about $\{1,0,0\}$ with rotation angle $(\Phi_{2V}(\omega)-\Phi_{2H}(\omega))$ and the second 50/50 directional coupler 10 is designed to give a 270° rotation about $\{0,1,0\}$. Thus, the combined transformation of Stage 2 is equivalent to a rotation about $\{0,0,1\}$ with rotation angle of $(\Phi_{2V}(\omega)-\Phi_{2H}(\omega))$. Stage 3 is again another set of $N_3$ APF for each of the waveguides 11, 12 to generate phase response of $\Phi_{3H}(\omega)$ for waveguide 11 and $\Phi_{3V}(\omega)$ for waveguide 12. Transmission through Stage 3 again corresponds to a rotation about $\{1,0,0\}$ with rotation angle $(\Phi_{3V}(\omega)-\Phi_{3H}(\omega))$. After Stage 3, the two polarizations are recombined on a single waveguide 12 via a polarization rotator 14 and a polarization beam combiner 16. Stage 4 comprises of another set of APF to compensate the isotropic dispersion accumulated through Stage 1 to 3.

After knowing the required rotation angles of $\theta_1(\omega)$, $\theta_2(\omega)$ and $\theta_3(\omega)$ for all-frequency PMD compensation using equations (6–9) and (12–13), the corresponding $\Phi_{iH}(\omega)$ and $\Phi_{iV}(\omega)$ can be derived from $$\Phi_{iV}(\omega) - \Phi_{iH}(\omega) = \theta_i(\omega) \quad (15)$$

One can arbitrarily choose $$\Phi_{iV}(\omega) + \Phi_{iH}(\omega) = 2N_i(\pi - \omega T) \text{ for } i=1,2,3 \quad (16)$$

so that the net isotropic dispersion introduced by the APF in both waveguides is simply a group delay. From equations (15) and (16), one gets $$\Phi_{iV}(\omega) = N_i(\pi - \omega T) + \frac{\theta_i(\omega)}{2} \quad (17)$$

To obtain the parameters $\phi_k$ and $r_k$ for each APF in each waveguide, one fits equation (14) with equations (17) and (18) using a nonlinear fit subroutine that is available in standard Mathematical software packages. With small $N_i$, this nonlinear fit can be fast and efficient. Note that if the fitting is perfect, from equation (16), the first three stages only introduce isotropic dispersion $$\frac{(\Phi_{iV}(\omega) + \Phi_{iH}(\omega))}{2}$$

in the form of group delay. Thus, Stage 4 is redundant. However, in reality, since the fitting is done separately for equation (17) and (18), this isotropic dispersion often deviates from a simple group delay, and Stage 4 is needed for compensating these accumulated isotropic dispersions.

To test the compensation scheme, two simulations are used. For both simulations, the mean DGD are chosen to be ~70% of the bit period so that higher order PMD dominates the signal's degradation. These mean DGDs are a factor of ~7 larger than the tolerable first order PMD. For the first simulation, 500 fibers are randomly generated with mean DGD of 17.5 ps by cascading 15 randomly oriented birefringence sections. The birefringence of these sections is Gaussian distributed with mean value of 4.9 ps and with standard deviation of 20% of this mean value. The input signal is a 40 Gbit/s RZ pseudo-random bit sequences ($2^6-1$) of Gaussian pulses of 10 ps (FHWM) pulse-width. For each generated fiber, one can compute the output PMD vector, $\vec{\tau}(\omega)$, as a function of frequency with optical frequency step-size of $\Delta f=0.63$ GHz. Based on this PMD vector data, one can compute the required rotation angles $\theta_1(\omega)$, $\theta_2(\omega)$ and $\theta_3(\omega)$ using Eqs. (6–9) and (12–13).

Figure 3A:
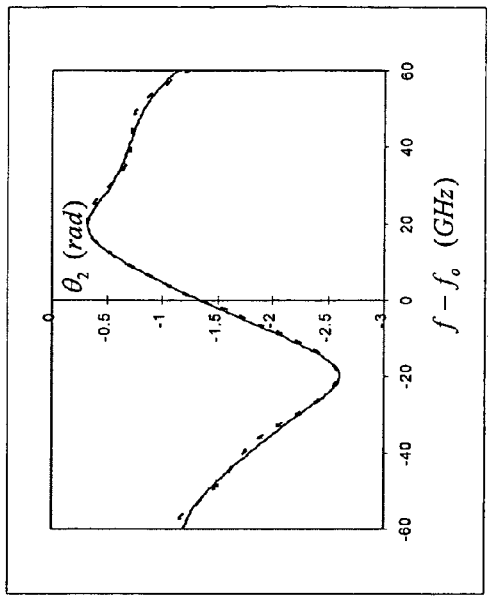
FIGS. 3A–3D are graphs demonstrating the required rotation angles for various stages of the PMD compensator as a function of frequency.
Figure 3B:
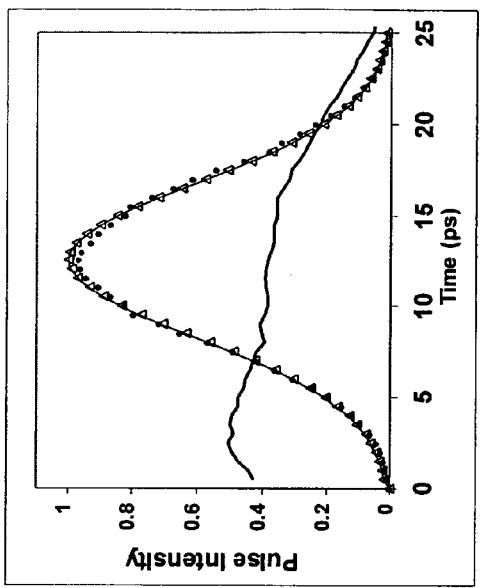
Figure 3C:
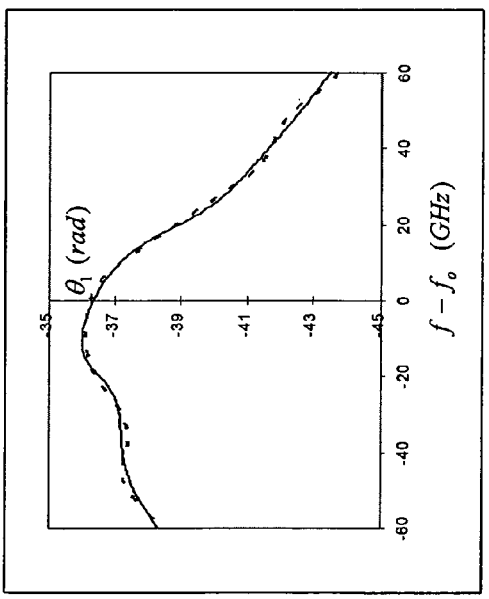
Figure 3D:
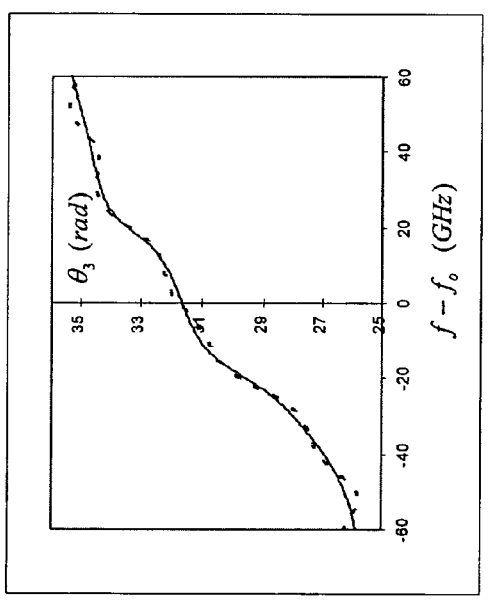

From a randomly chosen fiber, the required rotation angles for the various stages are plotted as solid curves in FIGS. 3A–3C. FIG. 3A is for $\theta_1(\omega)$ of Stage 1, FIG. 3B is for $\theta_2(\omega)$ of Stage 2, and FIG. 3C is for $\theta_3(\omega)$ of Stage 3. The thick solid curve in FIG. 3D shows the output signal from the fiber while the thin solid curve is the input signal. Using the exact profiles of the required rotation angles $\theta_1(\omega)$, $\theta_2(\omega)$ and $\theta_3(\omega)$, the signal after passing through the PMD compensator is given by the curve of unfilled triangles. The compensation is near perfect. To illustrate that the synthesis of these rotation angles using APF is feasible, one can fit Eqs. (17) and (18) using the "NonlinearFit" subroutine in Mathematica. The number of APF used are $N_1=N_2=N_3=5$.

The synthesized rotation angles using the APF are plotted as dashed line curve in FIGS. 3A–3C. The signal after PMD compensation using the synthesized rotation angles from APF is shown as the curve of filled circles in FIG. 3D. The signal is recovered to almost its initial shape.

FIGS. 4A–4D shows eye-diagrams of the signal by overlapping "ones" and "zeros" of the 500 randomly generated fiber. FIG. 4A is the eye-diagram of output signal from the fiber before compensation. The mean DGD of 17.5 ps is so large that there is hardly any opening in the "eye". FIG. 4C shows the eye-diagram of the signal after the PMD compensator using exact rotation angles calculated from Eqs. (6–9) and (12–13). The "eye" is recovered to near perfect. FIG. 4D shows the eye-diagram of the signal after the PMD compensator using synthesized rotation angles from APF. It is evident that the quality of the signal has also improved significantly. To illustrate that higher order PMD dominates the signal's degradation when the mean DGD is large, one can pass the output signal from fiber into a first order PMD compensator and plot its eye-diagram in FIG. 4B. This first-order PMD compensator is comprised of a polarization controller followed by a variable DGD. The "eye" hardly opens up which confirms that higher order PMD significantly degrades the signal.

For the second simulation, another 500 fibers are randomly generated with mean DGD of 4.35 ps by cascading 15 randomly oriented birefringence sections. The birefringence of these sections is Gaussian distributed with mean value of 1.22 ps and with standard deviation of 20% of this mean value. This time, the input signal is a 160 Gbit/s RZ pseudo-random bit sequences ($2^6-1$) of Gaussian pulses of 2.5 ps (FHWM) pulse-width. The step-size of the optical frequency $\Delta f$ used is 2.54 GHz. The abovementioned compensation procedures are again applied and the eye-diagrams are plotted in FIGS. 5A–5C.

FIG. 5A is shows the output signal from the fiber before compensation, and FIG. 5B shows the signal after the PMD compensator using exact rotation angles calculated from equations (6–9) and (12–13). FIG. 5C shows the eye-diagram of the signal after the PMD compensator using synthesized rotation angles from APF. Significant improvement to the signal's quality is again evident even for 160 Gbit/s transmission bit rate. With new generation low-PMD fiber, the mean DGD of the fiber can be as low as 0.05 ps/$\sqrt{km}$. Thus, the mean DGD of 4.35 ps used in the simulation corresponds to a propagation distance of ~7500 km. The encouraging results from the simulation seems to indicate that PMD compensation schemes may help to make 160 Gbit/s transmission through many thousands of kilometers feasible if new generation of low-PMD fiber is deployed.

The inventive architecture of an All-Frequency PMD compensator in a feedforward compensation scheme is provided. It is comprised of 4 stages. The first two stages give an equivalent frequency dependent polarization rotation effect, the third stage provides the frequency dependent variable DGD while the last stage compensates for the isotropic dispersion created by the first three stages. In Stokes space formulation, the algorithm is described to find the required rotation angles of each stages using PMD concatenation rules. These rotation angles are shown can be implemented using APF in a compact integrated optics circuit. Through simulations of 40 Gbits/s and 160 Gbit/s transmission, one can illustrate significant improvement of the signal quality using the compensator and also give evidence that 160 Gbit/s transmission through several thousand kilometres of propagation may be feasible with new generation of low-PMD fiber and the all-frequency PMD compensator.

The invention also provides for an implementation of a deterministic All-Frequency PMD (AFPMD) emulator that can generate any desired PMD vector for all frequencies. In the other words, one can "dial-in" any spectrum of PMD vector that comprises of all orders of PMD. This emulator employs four stages as shown in FIG. 6A. At each angular frequency $\omega$ ($\omega = 2\pi f$ where f is the optical frequency), the "dial-in" PMD vector $\vec{\tau}_e(\omega)$ has three parameters $$\begin{pmatrix} \tau_{ex}(\omega) \\ \tau_{ey}(\omega) \\ \tau_{ez}(\omega) \end{pmatrix}.$$

The first three stages of the emulator provide the three degrees of freedom for emulating the PMD at each frequency. Stage 4 only compensates the isotropic dispersion introduced by the first three stages.

In Stokes space, Stage 1 and 3 are rotations about $\{1,0,0\}$ with rotation angle $\theta_1(\omega)$ and $\theta_3(\omega)$ respectively. Stage 2 is a rotation about the $\{0,0,1\}$ with rotation angle $\theta_2(\omega)$. Rotation angles $\theta_1(\omega)$, $\theta_2(\omega)$ and $\theta_3(\omega)$ are general functions of frequency, in contrast to the linear dependence on frequency of a birefringent element. The rotation matrices of Stages 1 and 3 are $$R_i(\omega) = \begin{pmatrix} 1 & 0 & 0 \\ 0 & \cos\theta_i(\omega) & -\sin\theta_i(\omega) \\ 0 & \sin\theta_i(\omega) & \cos\theta_i(\omega) \end{pmatrix} \text{ for } i = 1 \text{ and } 3 \quad (19)$$

and the rotation matrix of Stage 2 is $$R_2(\omega) = \begin{pmatrix} \cos\theta_2(\omega) & -\sin\theta_2(\omega) & 0 \\ \sin\theta_2(\omega) & \cos\theta_2(\omega) & 0 \\ 0 & 0 & 1 \end{pmatrix} \quad (20)$$

Since $$\vec{\tau} \times \frac{dR}{d\omega} R^+,$$

the corresponding PMD vectors of Stage 1, 2, and 3 are $$\vec{\tau}_1(\omega) = \begin{pmatrix} \frac{d\theta_1(\omega)}{d\omega} \\ 0 \\ 0 \end{pmatrix}, \vec{\tau}_2(\omega) = \begin{pmatrix} 0 \\ 0 \\ \frac{d\theta_2(\omega)}{d\omega} \end{pmatrix} \text{ and } \vec{\tau}_3(\omega) = \begin{pmatrix} \frac{d\theta_3(\omega)}{d\omega} \\ 0 \\ 0 \end{pmatrix}$$

respectively. To account for the input state of polarization (SOP), one can transform the concatenated PMD to the input plane. With the PMD concatenation rule, the PMD vector after Stage 3 transformed to the input plane of the emulator is given as $$\vec{\Gamma}_{3s}(\omega) = \vec{\tau}_1(\omega) + R_1^+(\omega)\vec{\tau}_2(\omega) + R_1^+(\omega)R_2^+(\omega)\vec{\tau}_3(\omega) \quad (21)$$

$$= \begin{pmatrix} \dfrac{d\theta_1}{d\omega} + \cos\theta_2 \dfrac{d\theta_3}{d\omega} \\ \sin\theta_1 \dfrac{d\theta_2}{d\omega} - \cos\theta_1\sin\theta_2 \dfrac{d\theta_3}{d\omega} \\ \cos\theta_1 \dfrac{d\theta_2}{d\omega} + \sin\theta_1\sin\theta_2 \dfrac{d\theta_3}{d\omega} \end{pmatrix}$$

For a given "dial-in" PMD vector spectrum $$\vec{\tau}_e(\omega) = \begin{pmatrix} \tau_{ex}(\omega) \\ \tau_{ey}(\omega) \\ \tau_{ez}(\omega) \end{pmatrix},$$

one can set $\vec{\Gamma}_{3s}(\omega) = \vec{\tau}_e(\omega)$ and solve to obtain $$\frac{d\theta_1}{d\omega}(\omega) = \cot\theta_2(\omega)[\tau_{ey}(\omega)\cos\theta_1(\omega) - \tau_{ez}(\omega)\sin\theta_1(\omega)] + \tau_{ex}(\omega) \quad (22)$$

$$\frac{d\theta_2}{d\omega}(\omega) = \tau_{ey}(\omega)\sin\theta_1(\omega) + \tau_{ez}(\omega)\cos\theta_1(\omega) \quad (23)$$

$$\frac{d\theta_3}{d\omega}(\omega) = \csc\theta_2(\omega)[\tau_{ez}(\omega)\sin\theta_1(\omega) - \tau_{ey}(\omega)\cos\theta_1(\omega)] \quad (24)$$

Note that this "dial-in" PMD vector spectrum $\vec{\tau}_e(\omega)$ is for the input plane. The synthesis algorithm for the required rotation angles of the three stages is as followed: At an initial frequency, $\omega_{initial}$, one can arbitrarily fix the rotation angles of Stage 1, 2 and 3 to be 0, $\pi/2$ and 0 respectively. These $\theta_1(\omega_{initial})$, $\theta_2(\omega_{initial})$ and $\theta_3(\omega_{initial})$ provide the starting points for the algorithm. For subsequent frequencies, the rotation angles are found in a step-wise manner:

$$\theta_i(\omega + \Delta\omega) \approx \theta_i(\omega) + \frac{d\theta_i}{d\omega}(\omega)\Delta\omega \text{ for } i = 1, 2 \text{ and } 3 \quad (25)$$

where the $$\frac{d\theta_i}{d\omega}(\omega)$$

are given by equations (22–28). In this way, one can successively synthesize the required profiles of the rotation angles of the first three stages to generate any desired spectrum of PMD vectors $\vec{\tau}_e(\omega)$.

One promising implementation of the proposed architecture is shown in FIG. 6B. It is based on All-Pass Filters (APFs) integrated on a planar lightwave circuit. However, the required phase responses of these filters are distinctly different from other approaches to approximate the inverse Jones matrix while the aim is to emulate its frequency-dependent part (i.e. $jU^+U_\omega(\omega)$). The incoming signals are split into two waveguides (waveguide 50 and waveguide 52) by a polarization beam splitter. The polarization in waveguide 52 is rotated by 90°. Stage 1 is comprised of a set of $N_1$ APFs for each of the waveguides to generate phase responses of $\Phi_{1H}(\omega)$ for waveguide 50 and $\Phi_{1V}(\omega)$ for waveguide 52. In Stokes space, transmission through Stage 1 corresponds to a rotation about $\{1,0,0\}$ with rotation angle $(\Phi_{1V}(\omega)-\Phi_{1H}(\omega))$.

Stage 2 is comprised of a 50/50 directional coupler 58 with matched propagation constants, followed by another set of $N_2$ APFs for each of the waveguides 50, 52, and then by another 50/50 directional coupler 60 with matched propagation constants. This set of APFs generates phase responses of $\Phi_{2H}(\omega)$ for waveguide 50 and $\Phi_{2V}(\omega)$ for waveguide 52. In Stokes space, the first 50/50 directional coupler 58 gives a 90° rotation about $\{0,1,0\}$, the APF portion of Stage 2 is a rotation about $\{1,0,0\}$ with rotation angle $(\Phi_{2V}(\omega)-\Phi_{2H}(\omega))$ and the second 50/50 directional coupler 60 is designed to give a 270° rotation about $\{0,1,0\}$. Thus, the combined transformation of Stage 2 is equivalent to a rotation about $\{0,0,1\}$ with rotation angle of $(\Phi_{2V}(\omega)-\Phi_{2H}(\omega))$. Stage 3 is again another set of $N_3$ APFs for each of the waveguides 50, 53 to generate a phase response of $\Phi_{3H}(\omega)$ for waveguide 50 and $\Phi_{3V}(\omega)$ for waveguide 52.

Transmission through Stage 3 again corresponds to a rotation about $\{1,0,0\}$ with rotation angle $(\Phi_{3V}(\omega)-\Phi_{3H}(\omega))$. After Stage 3, the two polarizations are recombined on a single waveguide 52 via a polarization rotator 62 and a polarization beam combiner 64. Stage 4 comprises of another set of APFs to compensate the isotropic dispersion accumulated through Stage 1 to 3.

All-pass filters (APFs) have unity magnitude response; and, by cascading them, one can engineer the phase response to approximate any desired response. Two common implementations of optical APF are a) a ring resonator coupled to a straight waveguide and b) an etalon that has a perfect mirror on one side. The former is preferred for compact integrated optics. The latter is also known as a Gires-Tournois interferometer. The phase response of a set of $N_i$ APFs is given by:

$$\Phi_i(\omega) = N_i(\pi - \omega T) - \sum_k^{N_i}\left(\phi_k + 2\tan^{-1}\left(\frac{r_k\sin(\omega T + \phi_k)}{1 - r_k\cos(\omega T + \phi_k)}\right)\right) \quad (26)$$

where $\phi_k$ determines the cavity's resonant frequency, $r_k$ is the partial reflectance and is related to the power coupling ratio into the cavity, $\kappa_k$, by $r_k = mt;rl;\sqrt{1-\kappa infbeginitalkenditalresetrlxmx}$ and $T$ is the feedback path round trip delay and is related to the free spectral range (FSR) by $$T = \frac{1}{FSR}.$$

Any phase response can be engineered by varying the filter parameters $\phi_k$ and $r_k$.

After determining the required rotation angles $\theta_1(\omega)$, $\theta_2(\omega)$ and $\theta_3(\omega)$ using equations (22–25), the corresponding $\Phi_{iH}(\omega)$ and $\Phi_{iV}(\omega)$ can be derived from $$\Phi_{iV}(\omega) - \Phi_{iH}(\omega) = \theta_1(\omega) \quad (27)$$

One can arbitrarily choose $$\Phi_{iV}(\omega)+\Phi_{iH}(\omega)=2N_i(\pi-\omega T) \text{ for } i=1, 2 \text{ and } 3 \quad (28)$$

so that the net isotropic dispersion introduced by the APF in both waveguides is simply a group delay. From equations (9) and (10), one can write $$\Phi_{iV}(\omega) = N_i(\pi - \omega T) + \frac{\theta_i(\omega)}{2} \quad (29)$$

$$\Phi_{iH}(\omega) = N_i(\pi - \omega T) - \frac{\theta_i(\omega)}{2} \quad (30)$$

To obtain the parameters $\phi_k$ and $r_k$ for each APF in each waveguide, one can fit equation (26) with equations (29) and (30) using a nonlinear fit subroutine that is available in standard mathematics software packages. With small $N_i$, this nonlinear fit can be fast and efficient. Note that if the fitting is perfect, from equation (29), the first three stages only introduce isotropic dispersion $$\frac{(\Phi_{iV}(\omega) + \Phi_{iH}(\omega))}{2}$$

in the form of a group delay. Thus, Stage 4 is redundant. However, in reality, since the fitting is done separately for equation (29) and (30), this isotropic dispersion often deviates from a simple group delay, and Stage 4 is needed to compensate the accumulated isotropic dispersion.

To test the AFPMD emulator, one can randomly simulate fibers by cascading 30 randomly oriented birefringence sections. The birefringence of these sections is Gaussian distributed with a mean value of 0.86 ps and with a standard deviation of 20% of this mean value. This corresponds to a mean differential group delay of 4.35 ps. The concatenated PMD vectors of this simulated fiber of 30 sections are computed over a frequency range of ±250 GHz about the carrier's optical frequency $f_o$ with a step-size $\Delta f$=2.54 GHz. The PMD vectors are transformed to the input plane. This spectrum serves as the "dial-in" PMD vector spectrum for the AFPMD emulator.

Figure 7:
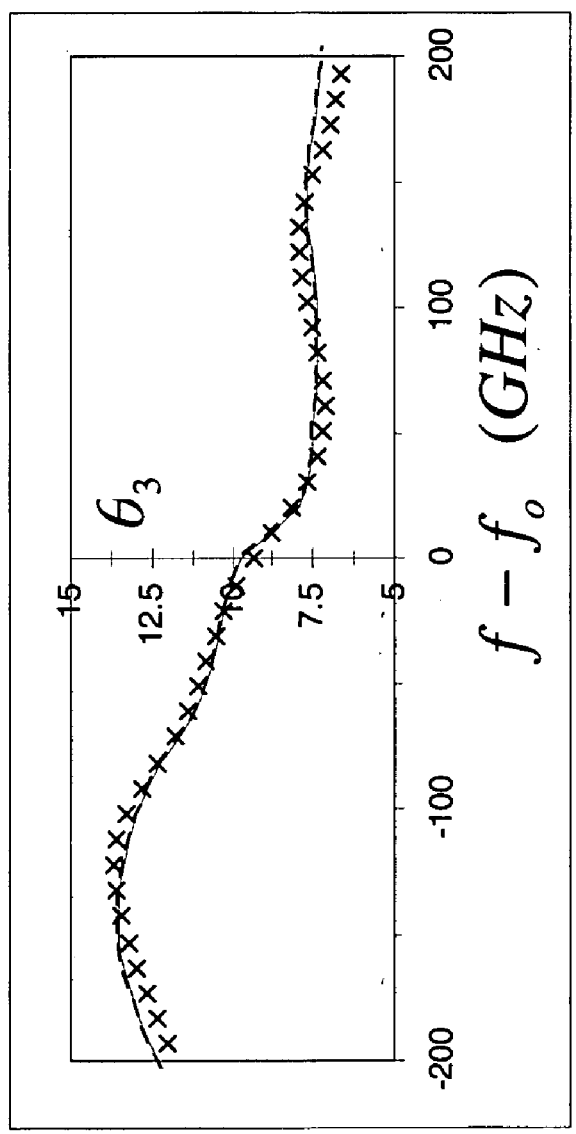
FIG. 7 is a graph demonstrating the rotational angles for a simulated fiber.

Based on this spectrum, the required rotation angles $\theta_1(\omega)$, $\theta_2(\omega)$ and $\theta_3(\omega)$ are computed using equation (22–25) and then fit equations (29) and (30) using the "NonlinearFit" subroutine in Mathematica. The number of APFs used are $N_1=N_2=N_3=3$. All APF have the same FSR of 500 GHz. FIG. 7 shows the rotational angles for a simulated fiber randomly chosen from the ensemble. The solid line curves are the required rotation angles while the curves of crosses are the rotation angles synthesized by the APF.

Figure 8:
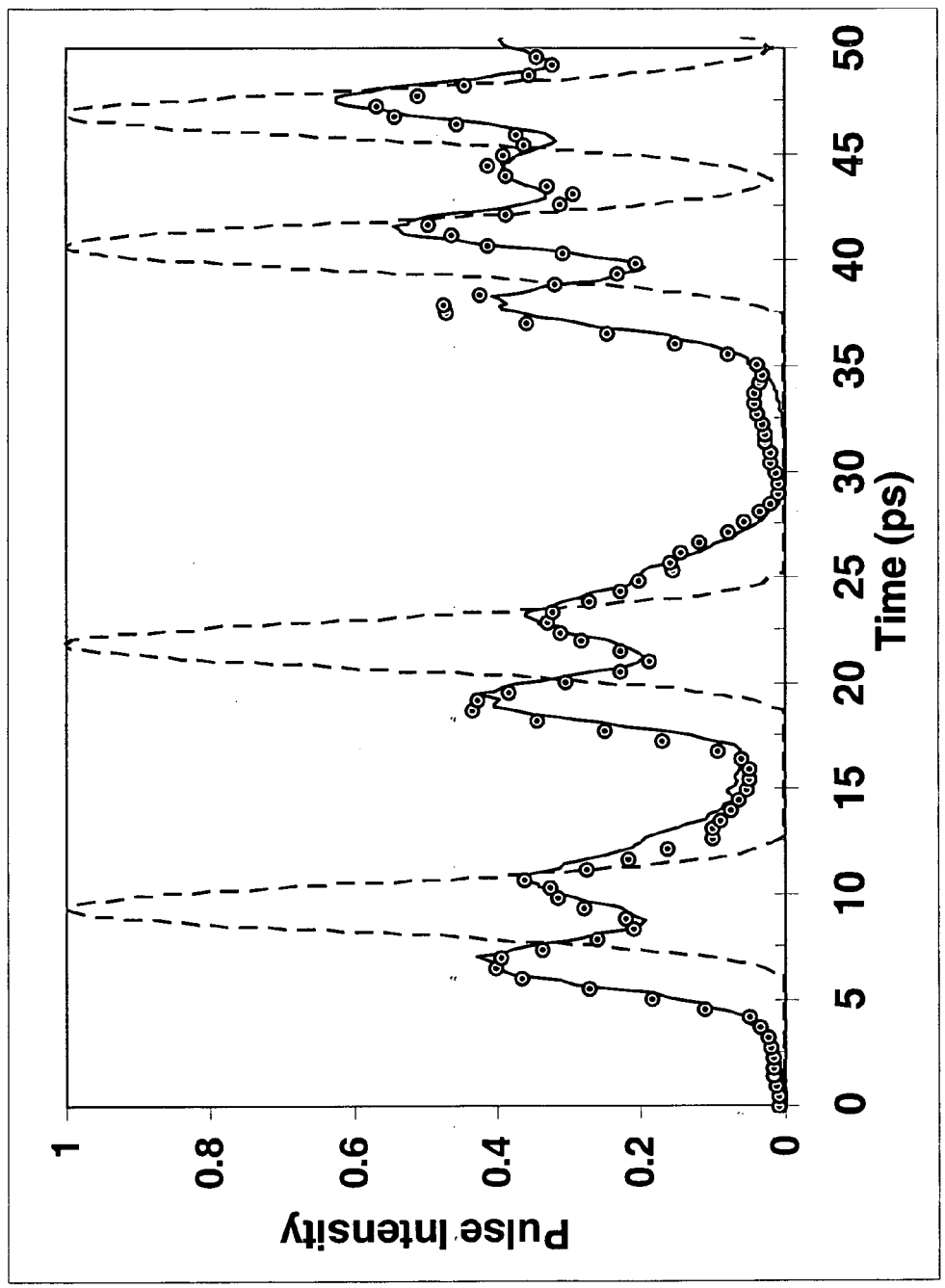
FIG. 8 is a graph illustrating an output signal from the fiber after emulation.

To investigate the performance of the AFPMD emulator, one can send a train of 160 Gbit/s RZ pseudo-random bit sequences ($2^6$-1) of Gaussian pulses of 2.5 ps (FHWM) pulse-width through this particular simulated fiber of 30 sections and also through the AFPMD emulator with the same input SOP. If their output signals match, it indicates that the AFPMD emulator has produced the same PMD spectrum as that of the simulated fiber of 30 sections. FIG. 8 shows both the output signals. The solid line curve is for the simulated fiber of 30 sections while the curve of filled circles is for the AFPMD emulator. The input signal is shown as the dashed line. The two output signals match closely, thereby demonstrating the capability of the AFPMD emulator in generating an arbitrary PMD spectrum. Good agreements are also observed for other fiber realizations in the simulations.

The architecture of an All-Frequency PMD emulator based on four stages of APF is provided for by the invention. The first three stages provide the three degrees of freedom for emulating PMD at each frequency, while the last stage compensates for the isotropic dispersion created by the first three stages. In Stokes space formulation, one can describe the algorithm to synthesize the required rotation angle of each stage using PMD concatenation rules. Also, these rotation angles can be implemented using APFs in a compact integrated optics circuit. Through simulations of 160 Gbit/s transmission, one can demonstrate good fidelity of the AFPMD emulator in generating any desired spectrum of PMD vectors.

Although the present invention has been shown and described with respect to several preferred embodiments thereof, various changes, omissions and additions to the form and detail thereof, may be made therein, without departing from the spirit and scope of the invention.

What is claimed is:

1. A polarization mode dispersion (PMD) device comprising:
   a first stage that receives a signal and performs rotation about $\{1,0,0\}$ on said signal, said first stage outputs a first signal;
   a second stage that receives said first signal and performs a rotation about $\{0,0,1\}$ on said first signal, said second stage outputs a second signal that represents the alignment of the PMD of various frequencies into a common direction; and
   a third stage that receives said second signal and provides the necessary frequency dependent variable differential delay group (DGD) in the $\{1,0,0\}$ direction to cancel the PMD in any specified frequency range.

2. The PMD device of claim 1 further comprising a fourth stage that compensates for the isotropic dispersion introduced by said first, second and third stages due to imperfect fitting of rotation angles.

3. The PMD device of claim 1, wherein said first stage comprises a rotation angle $\theta_1(\omega)$ as a function of frequency.

4. The PMD device of claim 3, wherein said first stage comprises a rotation angle $\theta_2(\omega)$ as a function of frequency.

5. The PMD device of claim 1, wherein said first stage comprises all pass filters (APF) or any component that can generate flexible frequency-dependent phase profiles.

6. The PMD device of claim 1, wherein said second stage comprises all pass filters (APF) or any component that can generate flexible frequency-dependent phase profiles.

7. The PMD device of claim 1, wherein said third stage comprises all pass filters (APF) or any component that can generate flexible frequency-dependent phase profiles.

8. The PMD device of claim 1, wherein said second stage comprises a 50/50 directional coupler with matched propagation constants.

9. The PMD device of claim 4, wherein third stage comprises a rotation angle $\theta_3(\omega)$ as a function of frequency.

10. The PMD device of claim 9, wherein said third stage comprises the following relation to establish compensator $$\theta_3(\omega + \Delta\omega) \approx \theta_3(\omega) + \frac{d\theta_3}{d\omega}(\omega)\,\Delta\omega.$$

11. The PMD device of claim 9, wherein said first, second, and third stages comprise a relation, $$\theta_i(\omega + \Delta\omega) \approx \theta_i(\omega) + \frac{d\theta_i}{d\omega}(\omega) \Delta\omega \quad \text{for } i = 1, 2, \text{ and } 3,$$

that defines a compensator.

12. A method of operating a polarization mode dispersion (PMD) device comprising:
  receiving at a first stage a signal and performing rotation about {1,0,0} on said signal, said first stage outputs a first signal;
  receiving at a second stage said first signal and performs a rotation about {0,0,1} on said first signal, said second stage outputs a second signal that represents the alignment of the various PMD frequencies into a common direction; and
receiving at a third stage said second signal and provides the necessary frequency dependent variable differential group delay (DGD) in the {1,0,0} direction to cancel the PMD in any specified frequency range.

13. The method of claim 12 further comprising compensating at a fourth stage the isotropic dispersion introduced by said first, second and third stages due to imperfect fitting of rotation angles.

14. The method of claim 12, wherein said first stage comprises a rotation angle $\theta_1(\omega)$ as a function of frequency.

15. The method of claim 14, wherein said first stage comprises a rotation angle $\theta_2(\omega)$ as a function of frequency.

16. The method of claim 12, wherein said first stage comprises all pass filters (APF) or any component that can generate flexible frequency-dependent phase profiles.

17. The method of claim 12, wherein said second stage comprises all pass filters (APF) or any component that can generate flexible frequency-dependent phase profiles.

18. The method of claim 12, wherein said third stage comprises all pass filters (APF) or any component that can generate flexible frequency-dependent phase profiles.

19. The PMD device of claim 12, wherein said second stage comprises a 50/50 directional coupler with matched propagation constants.

20. The method of claim 12, wherein third stage comprises a rotation angle $\theta_3(\omega)$ as a function of frequency.

21. The method of claim 20, wherein said third stage comprises the following relation to establish compensator $$\theta_3(\omega + \Delta\omega) \approx \theta_3(\omega) + \frac{d\theta_3}{d\omega}(\omega) \Delta\omega.$$

22. The method of claim 20, wherein said first, second, and third stages comprise a relation, $$\theta_i(\omega + \Delta\omega) \approx \theta_i(\omega) + \frac{d\theta_i}{d\omega}(\omega) \Delta\omega \quad \text{for } i = 1, 2, \text{ and } 3,$$

that defines a compensator.

23. A polarization mode dispersion (PMD) compensator comprising:
  a first stage that receives a signal and performs rotation about {1,0,0} on said signal, said first stage outputs a first signal;
  a second stage that receives said first signal and performs a rotation about {0,0,1} on said first signal, said second stage outputs a second signal that represents the alignment of the various PMD frequencies into a common direction; and
  a third stage that receives said second signal and provides the necessary frequency dependent variable in the {1,0,0} direction to cancel the PMD in any specified frequency range.

24. The PMD compensator of claim 23 further comprising a fourth stage that compensates for the isotropic dispersion introduced by said first, second and third stages due to imperfect fitting of rotation angles.

25. The PMD compensator of claim 23, wherein said first stage comprises a rotation angle $\theta_1(\omega)$ as a function of frequency.

26. The PMD compensator of claim 25, wherein said first stage comprises a rotation angle $\theta_2(\omega)$ as a function of frequency.

27. The PMD compensator of claim 23, wherein said first stage comprises all pass filters (APF) or any component that can generate flexible frequency-dependent phase profiles.

28. The PMD compensator of claim 23, wherein said second stage comprises all pass filters (APF) or any component that can generate flexible frequency-dependent phase profiles.

29. The PMD compensator of claim 23, wherein said third stage comprises all pass filters (APF) or any component that can generate flexible frequency-dependent phase profiles.

30. The PMD compensator of claim 23, wherein said second stage comprises a 50/50 directional coupler with matched propagation constants.

31. The PMD compensator of claim 26, wherein third stage comprises a rotation angle $\theta_3(\omega)$ as a function of frequency.

32. The PMD compensator of claim 31, wherein said third stage comprises the following relation to establish compensator $$\theta_3(\omega + \Delta\omega) \approx \theta_3(\omega) + \frac{d\theta_3}{d\omega}(\omega) \Delta\omega.$$

33. A polarization mode dispersion (PMD) emulator comprising:
  a first stage that receives a signal and performs rotation about {1,0,0} on said signal, said first stage outputs a first signal;
  a second stage that receives said first signal and performs a rotation about {0,0,1} on said first signal, said second stage outputs a second signal that represents the alignment of the various PMD frequencies into a common direction; and
  a third stage that receives said second signal and provides the necessary frequency dependent variable in the {1,0,0} direction to cancel the PMD in any specified frequency range.

34. The PMD emulator of claim 33 further comprising a fourth stage that compensates for the isotropic dispersion introduced by said first, second and third stages due to imperfect fitting of rotation angles.

35. The PMD emulator of claim 33, wherein said first stage comprises a rotation angle $\theta_1(\omega)$ as a function of frequency.

36. The PMD emulator of claim 35, wherein said first stage comprises a rotation angle $\theta_2(\omega)$ as a function of frequency.

37. The PMD emulator of claim 33, wherein said first stage comprises all pass filters (APF) or any component that can generate flexible frequency-dependent phase profiles.

38. The PMD emulator of claim 33, wherein said second stage comprises all pass filters (APF) or any component that can generate flexible frequency-dependent phase profiles.

39. The PMD emulator of claim 33, wherein said third stage comprises all pass filters or any component that can generate flexible frequency-dependent phase profiles (APF).

40. The PMD emulator of claim 33, wherein said second stage comprises a 50/50 directional coupler with matched propagation constants.

41. The PMD emulator of claim 36, wherein third stage comprises a rotation angle $\theta_3(\omega)$ as a function of frequency.

42. The PMD emulator of claim 41, wherein said first, second, and third stages comprise a relation, $$\theta_i(\omega + \Delta\omega) \approx \theta_i(\omega) + \frac{d\theta_i}{d\omega}(\omega)\Delta\omega \text{ for } i = 1, 2, \text{ and } 3,$$

that defines an emulator.

* * * * *